J. RUBARTH.
APPARATUS FOR TILLING THE SOIL.
APPLICATION FILED JULY 3, 1912.
1,085,825.
Patented Feb. 3, 1914.
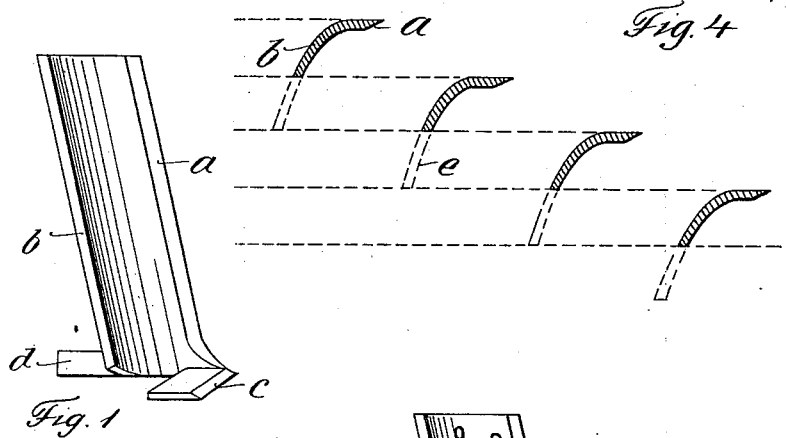
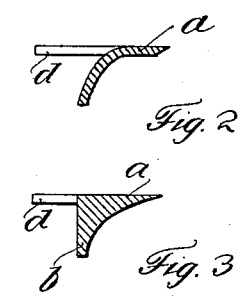
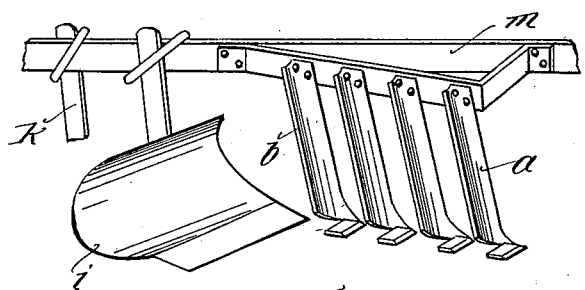

UNITED STATES PATENT OFFICE.

JOSEPH RUBARTH, OF MUNSTER, GERMANY.

APPARATUS FOR TILLING THE SOIL.

1,085,825.  Specification of Letters Patent.  Patented Feb. 3, 1914.

Application filed July 3, 1912. Serial No. 707,571.

*To all whom it may concern:*

Be it known that I, JOSEPH RUBARTH, a subject of the King of Prussia, German Emperor, residing at Munster, Kingdom of Prussia, German Empire, have invented certain new and useful Improvements in Apparatus for Tilling the Soil, of which the following is a specification.

This invention relates to an apparatus which is designed to till or cultivate the soil and, in combination with other implements, to prepare the ground in such a manner that it becomes ready for garden-culture when the apparatus has been once passed over it.

There have already become known machines for tilling the soil which comprise a certain number of knives combined to form a plow share. The apparatus according to this invention differs from these devices of known construction by the particular shape of the knife which consists of a vertical or almost vertical cutting edge which is parallel with the furrow and further of a curved part which serves for laterally displacing the earth cut out without however turning the same upside down.

In the accompanying drawings the invention is shown in several forms of construction.

Figure 1 shows a single standard in elevation. Figs. 2 and 3 represent in cross section two standards of different shape. Fig. 4 shows diagrammatically how the standards are arranged in a machine. Fig. 5 shows in elevation a standard of different construction. Fig. 6 shows in elevation a complete apparatus for tilling the soil.

The standard (Fig. 1), of which several are combined to form an apparatus, has a cutting edge $a$ and a curved body $b$ which is terminated by a horizontal runner $d$. The standard can be inclined at any required angle. A horizontal blade $c$ with cutting edges which is arranged at the lower end of the standard at the side of the cutting edge $a$ serves for maintaining the standard in the ground, for compensating the lifting strain and for facilitating the cutting of the earth. The runner $d$ is arranged at the lower end of the body of the standard opposite the cutting edge $a$ and serves for preventing the standard from turning. This runner $d$ can be made in one piece with the body of the standard and it can be arranged in such a manner that it stands at an angle to the body, so that the standard is wedge-shaped in cross section. Usually, four of such standards are attached to an iron frame in a diagonal row so that they cover together the length of a plow share or of a colter. In this case the curved body $b$ of the standard can be longer so that it overlaps the cutting edge of the next following standard. In this manner each preceding standard prepares for the next standard a furrow-shaped space as indicated in Fig. 4 by the dotted lines $e$. The cutting edge $a$ can be prolongated as shown in Fig. 5 by means of a chisel-shaped extension $h$.

Diagonal rows of standards are combined with a plow share or with a disk-shaped plow in such a manner that the standards act as sub-soil plows and serve merely for cutting the sole of the furrow or for cutting the soil open in front of the plow share $i$ and for turning the earth over and for throwing part of the earth directly into the open furrow, the remaining part of the earth being turned over by the plow share. If long dung is used, arms $k$ are attached to the iron frame $m$ for pushing the long dung into the furrow, said arms being arranged either behind the plow share or in front of the standards. The standards can further be used in connection with any other agricultural machine in which case, instead of being mounted upon the plow beam $m$, they are attached to the frames of the corresponding apparatus. In any case the standards can be arranged so that they can be lifted out of the operative position.

I claim:—

A cultivator blade for tilling the soil comprising in combination a standard having a body curved in cross section longitudinally of its length open in front and provided with the front cutting edge for pushing the earth laterally without turning the same upside down, a horizontal runner terminating said body, a horizontal blade with cutting edges, arranged at the lower end of the standard at the side of the cutting edge of the same, substantially as described and shown and for the purpose set forth.

In witness whereof I have hereunto set my hand in the presence of two witnesses.

JOSEPH RUBARTH.

Witnesses:
 JOHANNES SCHROEDER,
 HEDWIG ZUR HÖRST.

Copies of this patent may be obtained for five cents each, by addressing the "Commissioner of Patents, Washington, D. C."